(12) United States Patent
Slattery et al.

(10) Patent No.: US 11,480,200 B2
(45) Date of Patent: Oct. 25, 2022

(54) VALVE WITH ANTI-CAVITATION FEATURES

(71) Applicant: Parker-Hannifin Corporation, Cleveland, OH (US)

(72) Inventors: Brian Slattery, Hicksville, OH (US); Bipin Kashid, Strongsville, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 72 days.

(21) Appl. No.: 17/261,611

(22) PCT Filed: Jul. 24, 2019

(86) PCT No.: PCT/US2019/043228
§ 371 (c)(1),
(2) Date: Jan. 20, 2021

(87) PCT Pub. No.: WO2020/076391
PCT Pub. Date: Apr. 16, 2020

(65) Prior Publication Data
US 2021/0262494 A1 Aug. 26, 2021

Related U.S. Application Data

(60) Provisional application No. 62/742,522, filed on Oct. 8, 2018.

(51) Int. Cl.
*F16K 11/04* (2006.01)
*F15B 13/043* (2006.01)
(Continued)

(52) U.S. Cl.
CPC .......... *F15B 13/043* (2013.01); *F15B 21/047* (2013.01); *F16K 11/044* (2013.01)

(58) Field of Classification Search
CPC .. F16K 11/044; F16K 31/0627; F15B 13/043; F15B 21/047
See application file for complete search history.

(56) References Cited

U.S. PATENT DOCUMENTS

| 2,983,227 A | 5/1961 | English |
| 4,887,643 A | 12/1989 | Tomlin et al. |

(Continued)

FOREIGN PATENT DOCUMENTS

| DE | 22 21 238 A1 | 11/1973 |
| DE | 195 36 725 A1 | 4/1997 |

(Continued)

OTHER PUBLICATIONS

International Search Report and Written Opinion issued by the European Patent Office in International Application No. PCT/US2019/043228 dated Nov. 4, 2019.

(Continued)

*Primary Examiner* — Kelsey E Cary
(74) *Attorney, Agent, or Firm* — McDonnell Boehnen Hulbert & Berghoff LLP

(57) ABSTRACT

An example valve includes: (i) a valve body comprising a supply port and an operating port; (ii) a sleeve comprising a first opening fluidly coupled to the supply port, a second opening fluidly coupled to the operating port, and a seat; (in) a spool configured to move axially within the sleeve, wherein the spool is configured to he seated on the seat of the sleeve when the valve is unactuated, and wherein when the valve is actuated, the spool moves such that a gap is formed at the seat; and (iv) a flow restriction disposed downstream of the gap, wherein when the valve is actuated, fluid is allowed to flow from the supply port through the first opening and the gap and through die flow' restriction prior to flowing through the second opening to the operating port, (Continued)

such that the flow restriction generates an increased pressure level at the gap.

10 Claims, 8 Drawing Sheets

(51) Int. Cl.
  *F15B 21/047* (2019.01)
  *F16K 11/044* (2006.01)

(56) References Cited

U.S. PATENT DOCUMENTS

| | | | |
|---|---|---|---|
| 5,409,040 | A | 4/1995 | Tomlin |
| 6,318,406 | B1 | 11/2001 | Conley |
| 9,726,296 | B2 | 8/2017 | Neubauer et al. |
| 2003/0150498 | A1* | 8/2003 | Williams ............ F16K 11/044 137/625.65 |
| 2013/0056669 | A1* | 3/2013 | Matsumura ............ F16K 1/36 251/321 |
| 2014/0175311 | A1* | 6/2014 | Jamison ............ F16K 31/0627 251/129.15 |
| 2014/0352828 | A1* | 12/2014 | Landrum ............ F16K 11/044 137/625.48 |
| 2018/0112798 | A1* | 4/2018 | Junk ................ F16K 11/044 |
| 2018/0231135 | A1 | 8/2018 | Matteucci et al. |
| 2020/0041013 | A1* | 2/2020 | Lampton ............ F16K 11/0712 |

FOREIGN PATENT DOCUMENTS

| | | |
|---|---|---|
| DE | 100 07 349 A1 | 3/2001 |
| WO | WO 2018/125321 A1 | 7/2018 |

OTHER PUBLICATIONS

Schuster, G, "Verringerung Der Kavitationsneigung Bei ydralischen Ventilschiebern", Olehydraulik und Pneumatik: Steuerungen & Regelungen, vol. 48, No. 9, Sep. 1, 2004, pp. 575-579, English summary included.

* cited by examiner

VALVE WITH ANTI-CAVITATION FEATURES

CROSS-REFERENCE TO RELATED APPLICATION

This application claims priority to U.S. Provisional Application No. 62/742,522, filed Oct. 8, 2018, which is incorporated herein by reference in its entirety.

BACKGROUND

Cavitation can occur within valves due to vaporization of liquid as a result of pressure and fluid velocity changes. Cavitation could cause wear of valve components, which affects performance of the valve. When valve performance changes, the valve or some of its components could be replaced to restore the proper performance level of the valve. In some applications, however, the valves are located in hazardous or remote locations such as subsea environments. In these applications, replacing or performing valve maintenance could be challenging. Therefore, it is desirable to have a valve that reduces wear resulting from cavitation, particularly wear of valve components that affect performance of the valve so as to avoid frequent maintenance or replacement of the valve.

SUMMARY

The present disclosure describes implementations that relate to a valve with anti-cavitation features. In a first example implementation, the present disclosure describes a valve. The valve includes: (i) a valve body having a first longitudinal cavity therein, wherein the valve body comprises: (a) a supply port configured to be fluidly coupled to a source of fluid, and (b) an operating port configured to be fluidly coupled to another valve; (ii) a sleeve disposed in the first longitudinal cavity, wherein the sleeve comprises a second longitudinal cavity therein, and wherein the sleeve comprises (a) a first opening fluidly coupled to the supply port of the valve body, (b) a second opening fluidly coupled to the operating port of the valve body, and (c) a seat disposed on an interior peripheral surface of the sleeve; (iii) spool mounted within the second longitudinal cavity and configured to move axially therein, wherein the spool is configured to be seated on the seat of the sleeve when the valve is unactuated, and wherein when the valve is actuated, the spool moves within the second longitudinal cavity such that a gap is formed at the seat between an exterior peripheral surface of the spool and the interior peripheral surface of the sleeve; and (iv) a flow restriction disposed downstream of the gap, wherein when the valve is actuated, fluid is allowed to flow from the supply port through the first opening and the gap and through the flow restriction prior to flowing through the second opening to the operating port; such that the flow restriction generates an increased pressure level at the gap.

In a second example implementation, the present disclosure describes a hydraulic system. The hydraulic system includes: (i) an actuator; (ii) a main valve configured to fluidly couple the actuator to a source of fluid and to a tank; and (iii) a pilot valve fluidly coupled to the source of fluid and the tank, the pilot valve being configured to actuate the main valve. The pilot valve includes: (i) a valve body comprising (a) a supply port configured to be fluidly coupled to the source of fluid, and (b) an operating port configured to be fluidly coupled to the main valve; (ii) a sleeve comprising (a) a first opening fluidly coupled to the supply port of the valve body, (b) a second opening fluidly coupled to the operating port of the valve body, and (c) a seat disposed on an interior peripheral surface of the sleeve; (iii) a spool axially movable within the sleeve, wherein the spool is configured to be seated on the seat of the sleeve when the pilot valve is unactuated, and wherein when the pilot valve is actuated, the spool moves such that a gap is formed at the seat between an exterior peripheral surface of the spool and the interior peripheral surface of the sleeve; and (iv) a flow restriction disposed downstream of the gap, wherein when the pilot valve is actuated, fluid is allowed to flow from the supply port through the first opening and the gap and through the flow restriction prior to flowing through the second opening to the operating port, such that the flow restriction generates an increased pressure level at the gap.

In a third example implementation, the present disclosure describes a valve. The valve includes: (i) a valve body comprising: (a) a supply port configured to be fluidly coupled to a source of fluid, and (b) an operating port configured to be fluidly coupled to another valve; (ii) a first sleeve comprising (a) a first opening fluidly coupled to the supply port of the valve body, (b) a second opening fluidly coupled to the operating port of the valve body, and (c) a seat disposed on an interior peripheral surface of the first sleeve; (iii) a second sleeve disposed longitudinally adjacent to the first sleeve; (iv) a spool axially movable within the first sleeve and the second sleeve, wherein the spool is configured to be seated on the seat of the first sleeve when the valve is unactuated, and wherein when the valve is actuated, the spool moves such that a gap is formed at the seat between an exterior peripheral surface of the spool and the interior peripheral surface of the first sleeve; (v) a bushing disposed within the second sleeve, wherein the bushing interfaces with the spool and is axially movable therewith; and (vi) a flow restriction disposed downstream of the gap, wherein the flow restriction comprises a flow area formed between an exterior peripheral surface of the bushing and an interior peripheral surface of the second sleeve, and wherein when the valve is actuated, fluid is allowed to flow from the supply port through the first opening and the gap and through the flow restriction prior to flowing through the second opening to the operating port, such that the flow restriction generates an increased pressure level at the gap.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
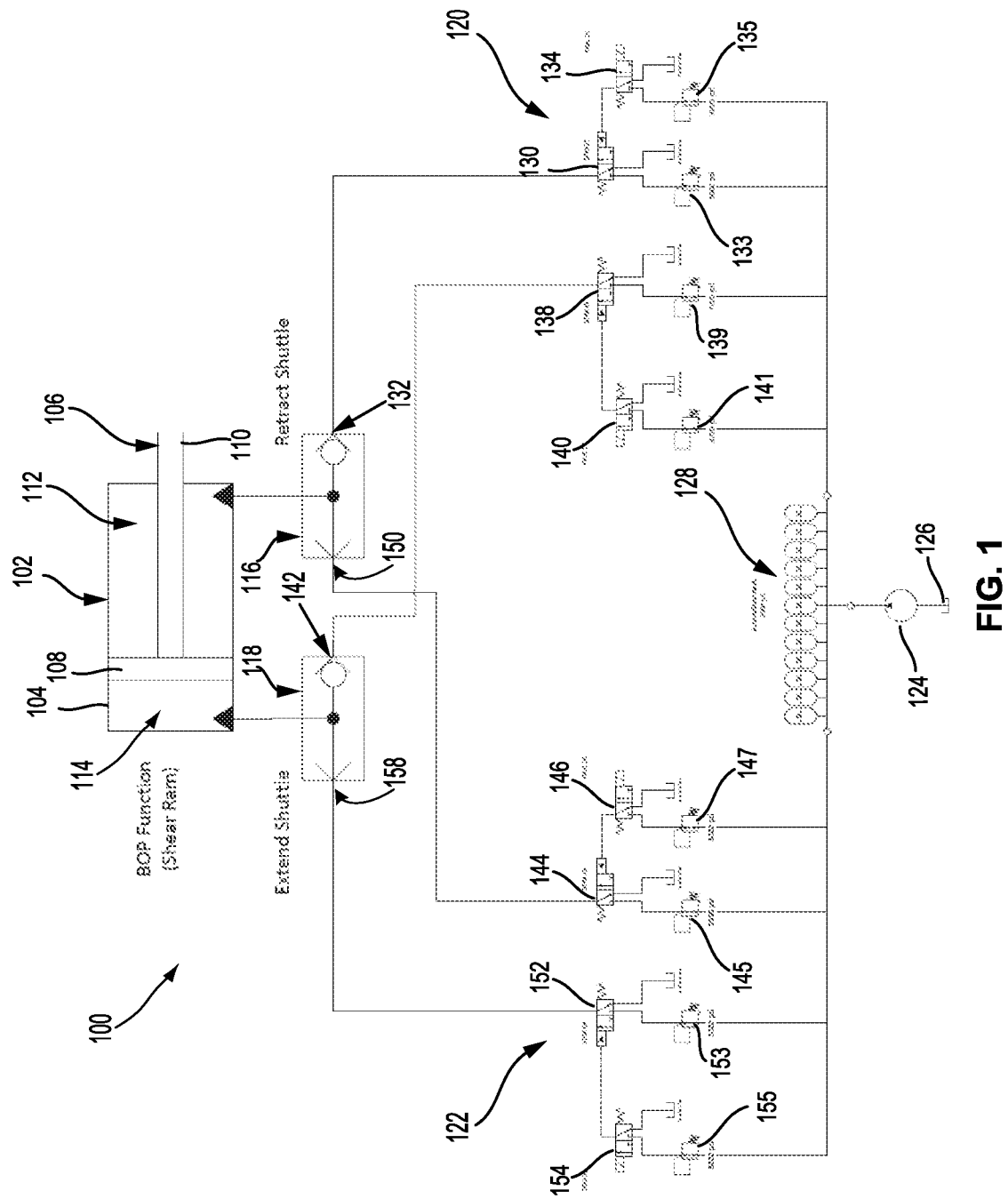
FIG. 1 illustrates a hydraulic system for a blowout preventer stack actuator, in accordance with an example implementation.

Subsea systems are used in offshore drilling to control and monitor oil and gas wells to prevent a blowout. In some cases, drilling occurs at remote locations and at deep water levels. These locations and deep water levels make maintenance of subsea systems challenging and hazardous. The subsea systems may include redundant and fail-safe equipment to reduce the likelihood of failure and downtime. Enhancing the reliability and durability of a component of a subsea equipment, even slightly, may improve the reliability and durability of the subsea equipment as a whole, thus reducing downtime and maintenance cost.

In examples, subsea equipment is used to perform various safety functions and operations. For example, a blowout preventer (BOP) stack involves various actuators to cope with erratic pressures and uncontrolled flow emanating from a well reservoir during drilling. In addition to controlling the downhole (occurring in the drilled hole) pressure and the flow of oil and gas, blowout preventers are intended to prevent tubing, tools and drilling fluid from being blown out of the wellbore.

A BOP stack may include several actuators (e.g., cylinders) controlled by corresponding valves. For example, the BOP stack may include a pipe ram that closes around a drill pipe restricting flow in an annulus area between the outside of a drill pipe and the wellbore, but does not obstruct flow within the drill pipe. The BOP stack may also include a blind or sealing ram, which has no openings for tubing, but can close off the well when the well does not contain a drill string or other tubing, and seal it. The BOP stack may further include a shear ram designed to shear the pipe in the well and seal the wellbore. The shear ram may have steel blades coupled to a piston of a hydraulic actuator and configured to shear the pipe and seal the annulus area between the outside of a drill pipe and the wellbore after shearing the pipe. The BOP stack may include several other actuators for other operations as well.

Thus, the BOP stack may be configured to perform several safety operations and monitor and maintain integrity of a well. In deep water applications, several BOP stacks could be used for redundancy. The actuators of the BOP stack may be controlled by valves that control communication of fluid to and from the actuator. If a valve fails, the actuator might not perform its operations properly, and costly maintenance and downtime may be incurred. Enhancing the reliability and durability of the valves multiplicatively enhances the reliability of the BOP stack as a whole.

Internal components of a valve may wear overtime due to cavitation occurring within the valve. Cavitation is more severe when a water-based fluid is used instead of hydraulic oil. In oil drilling environment, for example, water-glycol may be used because of its fire-resistant characteristics. If valve components wear due to cavitation, valve performance is negatively affected, which could affect performance of the actuator controlled by the valve. Replacing or maintaining the valve in a subsea environment is costly and might cause costly downtime for the associated equipment. Therefore, designing the valve to reduce the effects of cavitation and the resulting wear enhances the reliability and durability of the equipment and reduces the cost associated with maintenance and downtime.

Disclosed herein are valves and systems that may enhance durability of a valve by controlling the likelihood of occurrence and the location of cavitation within the valve. As such, wear due to cavitation may be reduced.

FIG. 1 illustrates a hydraulic system 100 for a BOP stack actuator, in accordance with an example implementation. The hydraulic system 100 includes an actuator 102 having a cylinder 104 and a piston 106. The actuator 102, may, for example, be associated with the ram shear operation of a BOP stack.

The piston 106 is slidably accommodated in the cylinder 104, and includes a piston head 108 and a rod 110 extending from the piston head 108 along a central axis direction of the piston 106. The piston head 108 divides the inside of the cylinder 104 into a first chamber 112 and a second chamber 114.

The hydraulic system 100 includes a retraction shuttle valve 116 that controls fluid flow to the first chamber 112. Particularly, the retraction shuttle valve 116 controls whether to communicate fluid to the first chamber 112 from a first control pod 120 or a second control pod 122. The hydraulic system 100 also includes an extension shuttle valve 118 that controls fluid flow to the second chamber 114. The extension shuttle valve 118 controls whether to communicate fluid to the second chamber 114 from the first control pod 120 or the second control pod 122.

The hydraulic system 100 may include the control pods 120, 122 for redundancy. If one of the control pods 120 and 122 malfunctions, the other control pod could operate the actuator 102.

The hydraulic system 100 can include one or more power units configured to provide pressurized fluid to the actuator 102. For example, the hydraulic system can include a pump 124 configured to pressurize fluid from a tank 126 and provide the pressurized fluid to accumulators 128. The accumulators 128 are configured to then provide the pressurized fluid to a plurality of main and pilot valves in the hydraulic system 100. As an example, the accumulators 128 may be configured to provide the pressurized fluid at a pressure level of 6000 pounds per square inch (psi). However, other pressure levels are possible, such as between 2000-7000 psi.

The hydraulic system 100 can include pressure control valves that control (e.g., reduce) pressure level of fluid provided to the main and pilot valves. Particularly, the accumulators 128 provide pressurized fluid to a main valve 130 that control flow of the pressurized fluid to a first port 132 of the retraction shuttle valve 116. A pressure control valve 133 can control pressure level of fluid provided from the accumulators 128 to the main valve 130. For instance, the pressure control valve 133 can reduce pressure level of fluid from 6000 psi to 5000 psi.

Actuation of the main valve 130 is controlled by a pilot valve 134. The pilot valve 134 is configured to control a limited-flow control feed to the main valve 130, which controls the main flow feed from the accumulators 128 to the first port 132. For example, the pilot valve 134 may have a flow capacity of 2 gallons per minute (GM), whereas the main valve 130 may have a flow capacity of 200 GPM. A pressure control valve 135 can control pressure level of fluid provided from the accumulators 128 to the pilot valve 134.

For instance, the pressure control valve 135 can reduce pressure level of fluid from 6000 psi to 3000 psi.

Thus the pilot valve 134 controls a high pressure or high flow feed of the main valve 130 using a limited-flow and limited-pressure feed. When the pilot valve 134 is actuated, the main valve 130 is actuated, and pressurized fluid is communicated from the accumulators 128 to the first port 132 of the retraction shuttle valve 116.

The first control pod 120 similarly has a main valve 138 and a pilot valve 140 that controls the main valve 138. The main valve 138 controls communication of pressurized fluid from accumulators 128 to a first port 142 of the extension shuttle valve 118. Pressure control valve 139 can regulate pressure level of fluid provided from the accumulators 128 to the main valve 138 and pressure control valve 141 can regulate pressure level of fluid provided from the accumulators 128 to the pilot valve 140.

In a similar configuration, the second control pod 122 includes a main valve 144 controlled by a pilot valve 146 and configured to control communication of pressurized fluid from the accumulators 128 to a second port 150 of the retraction shuttle valve 116. Pressure control valve 145 can regulate pressure level of fluid provided from the accumulators 128 to the main valve 144 and pressure control valve 147 can regulate pressure level of fluid provided from the accumulators 128 to the pilot valve 146.

The second control pod 122 can also include a main valve 152 controlled by a pilot valve 154 and configured to control communication of pressurized fluid from the accumulators 128 to a second port 158 of the extension shuttle valve 118. Pressure control valve 153 can regulate pressure level of fluid provided from the accumulators 128 to the main valve 152 and pressure control valve 155 can regulate pressure level of fluid provided from the accumulators 128 to the pilot valve 154.

In operation, if the pilot valve 140 is actuated, the main valve 138 is also actuated and allows pressurized fluid to flow to the second chamber 114 through the first port 142 of the extension shuttle valve 118, and the piston 106 extends. The fluid in the first chamber 112 is discharged through an outlet port (not shown) coupled to the cylinder 104 to a reservoir. On the other hand, if the pilot valve 134 is actuated, the main valve 130 is also actuated and allows pressurized fluid to flow to the first chamber 112 through the first port 132 of the retraction shuttle valve 116, and the piston 106 retracts. The fluid in the second chamber 114 is discharged through an outlet port (not shown) coupled to the cylinder 104 to the reservoir.

If a malfunction occurs in the first control pod 120, then the second control pod 122 can operate the actuator 102. For instance, if the pilot valve 154 is actuated, the main valve 152 is also actuated and allows pressurized fluid to flow to the second chamber 114 through the second port 158 of the extension shuttle valve 118, and the piston 106 extends. On the other hand, if the pilot valve 146 is actuated, the main valve 144 is also actuated and allows pressurized fluid to flow to the first chamber 112 through the second port 150 of the retraction shuttle valve 116, and the piston 106 retracts.

In examples, the control pods 120, 122 may be disposed in deep water. Malfunction of either control pod 120, 122 can thus be costly and time consuming. One cause of malfunction in the control pods 120, 122 can involve wear of internal components of the pilot valves 134, 140, 146, and 154. Wear of these internal components can lead to malfunction of the pilot valves and the hydraulic system 100 might not operate properly. For instance, malfunction of a pilot valve can lead to unintended actuation of a respective main valve without actuating the pilot valve, or can lead to no actuation of the respective main valve when actuating the pilot valve. Increasing the durability of the pilot valves may thus enhance the reliability and durability of the hydraulic system 100 as a whole, thus reducing maintenance, downtime, and the costs associated therewith.

One cause of malfunction of the pilot valves is wear resulting from cavitation. Cavitation is the formation of vapor cavities, i.e., small liquid-free zones ("bubbles" or "voids) in a liquid as a consequence of forces acting upon the liquid. Cavitation may occur when a liquid is subjected to rapid changes of pressure that cause the formation of bubbles where the pressure is relatively low. When subjected to higher pressure, the bubbles implode and can generate an intense shock wave.

Cavitation could cause wear in a valve as the bubbles implode near a metal surface of an internal component of the valve, resulting in cyclic stress through repeated implosion. This cyclic stress results in surface fatigue of the metal causing wear of the valve component.

Particularly, cavitation can occur in valves as flow velocity of pressurized fluid changes while traversing varying flow areas within a valve. Particularly, an increase in flow velocity in a particular flow area within the valve can be accompanied by a decrease in the fluid pressure level. If the pressure level drops below the vapor pressure of the fluid, the fluid may change from a liquid state to a vapor state, and bubbles may form in the flow stream. As the fluid flows away from the particular flow area to a larger flow area, pressure level may recover to a pressure level that is once again above the vapor pressure, and the vapor bubbles may collapse. The collapsing bubbles causes wear of impacted components near the collapse location within the valve.

Further, the nature of the fluid flowing through the valve may affect the extent of cavitation. Particularly, the existence of water in the fluid increases the likelihood of occurrence of cavitation because at high fluid velocities, water reaches its vapor pressure faster than other types of fluids such as hydraulic oil.

The hydraulic system 100 discussed above can be used in deep water oil and gas drilling locations. Water-glycol may be used as the pressurized fluid flowing through the various valves because water-glycol is a fire-resistant fluid suitable for oil and gas drilling locations and environments. However, because of the water in the water-glycol fluid, the likelihood of occurrence of cavitation increases, and valve wear can occur.

Disclosed herein is a valve with a configuration that reduces occurrence of cavitation. The disclosed configuration of the valve could also cause cavitation bubble implosion to occur at a location away from components, the wear of which might affect performance of the valve and lead to its malfunction. Thus, the configuration disclosed herein may increase the valve life and reduce maintenance and downtime costs.

Figure 2:
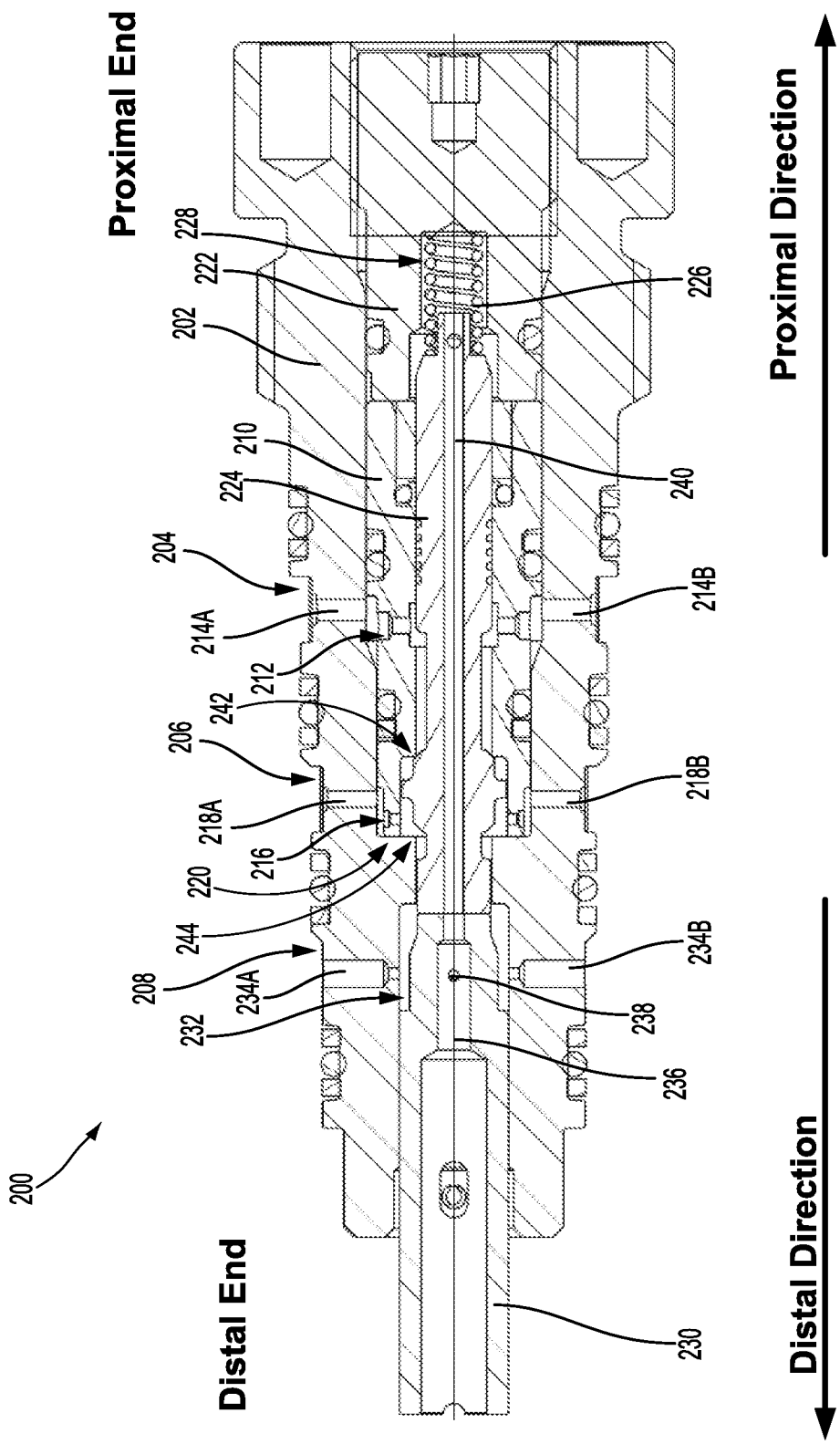
FIG. 2 illustrates a cross-sectional view of a valve, in accordance with an example implementation.

FIG. 2 illustrates a cross-sectional view of a valve 200, in accordance with an example implementation. The valve 200 can, for example, be used in any of the pilot valves 134, 140, 146, and 154.

The valve 200 has a housing or valve body 202 that has a supply port 204, a control or operating port 206, and a vent port 208. The ports 204, 206, and 208 are disposed longitudinally on an external peripheral surface of the valve body 202. In examples, the ports 204, 206, and 208 can be configured as annular grooves or cavities formed in an exterior peripheral surface of the valve body 202.

The supply port 204 can be fluidly coupled to a source of fluid (e.g., the pump 124 or the accumulators 128) configured to supply pressurized fluid (e.g., at 3000 psi via a pressure control valve) to the valve 200. The operating port 206 can be fluidly coupled to a control or inlet port of a main valve (e.g., the main valve 130, 138, 144, 15 to provide pressurized pilot fluid signal thereto and actuate the main valve. In other examples, the operating port 206 can be fluidly coupled to a port of any hydraulic consumer (e.g., hydraulic cylinder, motor, etc.).

The vent port 208 can be fluidly coupled to a tank or a reservoir (e.g., the tank 126) having fluid at a pressure level that is lower than the pressure level of fluid supplied by the source of pressurized fluid. For instance, the pressure level in the tank can be 70-140 psi. As shown in FIG. 2, the operating port 206 is disposed longitudinally between the supply port 204 and the vent port 208.

The valve body 202 defines a longitudinal cylindrical cavity therein. The longitudinal cylindrical cavity of the valve body 202 is configured to receive a sleeve 210 coaxial with the valve body 202. The sleeve 210 has one or more supply openings, such as a supply counterbore 212 and corresponding supply counterbores disposed in a radial array about the sleeve 210. The supply counterbore 212 is fluidly coupled to the supply port 204 through a plurality of cross-holes, such as cross-holes 214A, 214B, which can be disposed in a radial array about the valve body 202.

The sleeve 210 further includes one or more operating openings, such as operating counterbore 216 and corresponding operating counterbores disposed in a radial array about the sleeve 210. The operating counterbore 216 is fluidly coupled to the operating port 206 through a plurality of cross-holes, such as cross-holes 218A, 218B, which can be disposed in a radial array about the valve body 202. The term "counterbore" is used throughout herein to encompass a drilled hole that has a small-diameter portion that enlarges into a larger-diameter portion. The use and depiction of counterbores is not meant to be limiting. Straight or uniform-diameter holes can be used instead.

A distal end of the sleeve 210 is secured against a shoulder 220 that protrudes radially inward from an interior peripheral surface of the valve body 202. A proximal end of the sleeve 210 is secured against a retainer 222 mounted in the longitudinal cylindrical cavity of the valve body 202 at a proximal end of the valve body 202. With this configuration, the sleeve 210 is retained between the shoulder 220 and the retainer 222.

The sleeve 210 defines or includes a cavity therein that extends longitudinally within the sleeve 210. The valve 200 further includes a spool 224 disposed in the cavity defined within the sleeve 210, coaxial with the valve body 202 and the sleeve 210. The spool 224 is configured to move axially in the cavity of the sleeve 210.

The spool 224 narrows down toward a proximal end thereof to be received within coils of a spring 226. The spring 226 is disposed in a blind longitudinal chamber or blind longitudinal cavity 228 defined within the retainer 222. The spring 226 applies a biasing force on the spool 224 in the distal direction (e.g., to the left in FIG. 2).

The valve 200 further includes a push pin 230 disposed, at least partially, within the longitudinal cylindrical cavity of the valve body 202. A distal end of the spool 224 interfaces with a proximal end of the push pin 230. The push pin 230 narrows down at its proximal end such that an annular chamber or annular space 232 is formed between an exterior peripheral surface of the push pin 230 and an interior peripheral surface of the valve body 202. The annular space 232 is fluidly coupled to the vent port 208 via a plurality of cross-holes, such as cross-holes 234A, 234B, which can be disposed in a radial array about the valve body 202. Further, the annular space 232 is fluidly coupled to an internal longitudinal chamber 236, formed within the push pin 230, via at least one cross-hole 238 disposed in the push pin 230.

The internal longitudinal chamber 236 is axially aligned with, and fluidly coupled to, a longitudinal channel 240 formed within the spool 224. The longitudinal channel 240 extends longitudinally throughout the spool 224 to the proximal end of the spool 224. With this configuration, the blind longitudinal cavity 228 can be fluidly coupled to a reservoir or tank through the longitudinal channel 240, the internal longitudinal chamber 236, the cross-hole 238, the annular space 232, the cross-holes 234A, 234B, and the vent port 208. As such, the spool 224 is configured to be pressure-balanced because fluid having the same pressure level (e.g., pressure level of fluid in a tank coupled to the vent port 208) is communicated to both ends of the spool 224.

In examples, the valve 200 can be inserted into a manifold having a cavity configured to receive the valve 200 therein. The manifold can have a supply port configured to fluidly couple the manifold and the supply port 204 of the valve 200 to the source of fluid (e.g., a pump, accumulator, pressure regulator circuit, etc.). The manifold can also include a vent or return port configured to fluidly couple the manifold and the vent port 208 of the valve 200 to a reservoir or tank. The manifold can further include a control or operating port configured to fluidly couple the manifold and the operating port 206 of the valve 200 to an inlet port of a main valve.

The valve 200 can be actuatable via manual, electric, pneumatic, or hydraulic actuator. For example, the valve 200 can be actuated electrically by way of a solenoid actuator coupled to the valve 200. Such a solenoid actuator can have a solenoid coil surrounding the push pin 230. When the solenoid coil is energized, a solenoid force is applied on the push pin 230, the solenoid force pulls the push pin 230 in the distal direction toward a pole piece of the solenoid actuator. Further, the solenoid actuator can include a solenoid spring that interfaces, directly or indirectly, with the push pin 230 such that the solenoid spring biases the push pin 230, and the spool 224, to the proximal direction against the biasing force of the spring 226, which biases the spool 224 in the distal direction.

The solenoid spring can have a larger spring force or load compared to a respective spring load of the spring 226. As an example, the solenoid spring can have a spring load between 16 and 20 pound-force (lbf), whereas the spring 226 can have a spring load of 8 lbf. However, if the solenoid coil is energized, the solenoid actuator is configured to generate a solenoid force that, along with the biasing force of the spring 226, are sufficient to move the push pin 230 in the distal direction (to the left in FIG. 2) and overcome the force of the solenoid spring.

With this configuration, when the solenoid coil is de-energized (i.e., when the valve 200 is in the unactuated state), the solenoid spring pushes the push pin 230 in the proximal direction (i.e., to the right in FIG. 2), thus pushing the spool 224 against the spring 226. In the de-energized or unactuated state of the valve 200, the spool 224 rests against a first seat 242 disposed on, or formed by, an interior peripheral surface of the sleeve 210 as shown in FIG. 2. The term "seat" is used throughout herein to encompass a corner, tip, edge, or surface against which the spool 224 rests.

In the spool position shown in FIG. 2, the spool 224 blocks fluid flow from the supply port 204 to the operating port 206. However, when the spool 224 is in this position, fluid can flow from the operating port 206 through flow areas formed between an exterior peripheral surface of the spool 224 and an interior peripheral surface of the sleeve 210 and the valve body 202 to the vent port 208 as described below with respect to FIG. 3.

When the valve 200 is actuated (e.g., when the solenoid coil is energized), the push pin 230 is pulled in the distal direction (to the left in FIG. 2) against the solenoid spring. As a result, the push pin 230 is separated from the spool 224, and the spring 226 pushes the spool 224 in the distal direction, following the push pin 230. In the actuated or energized state of the valve 200, the spool 224 rests against a second seat 244 disposed on, or formed by, an interior peripheral surface of the valve body 202. In this position, the spool 224 is unseated off the first seat 242 and fluid is allowed to flow from the supply port 204 through flow areas area formed between the exterior peripheral surface of the spool 224 and the interior peripheral surface of the sleeve 210 to the operating port 206.

Figure 3:
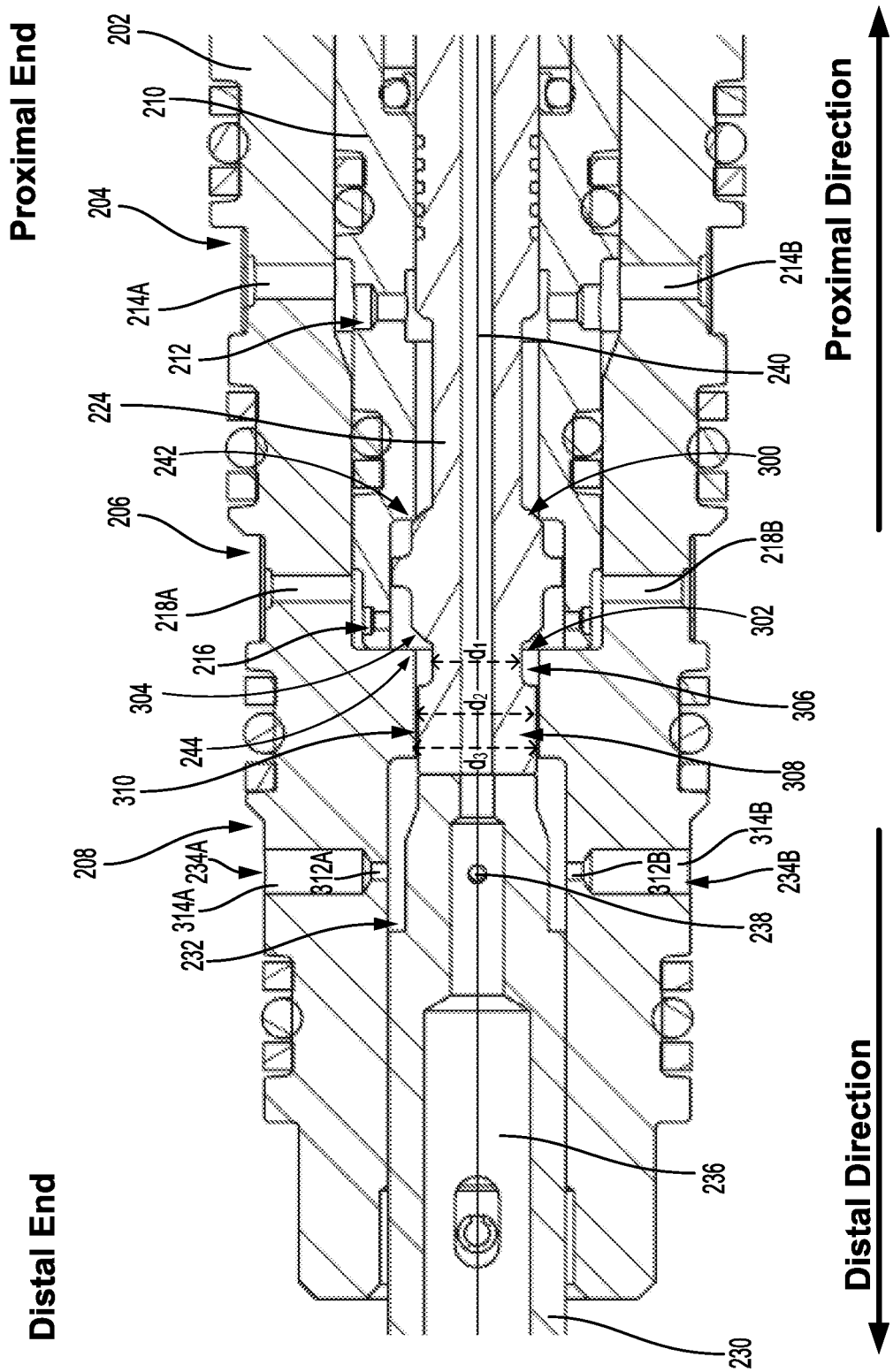
FIG. 3 illustrates a partial cross-sectional view of a valve in an unactuated state, in accordance with another example implementation.

FIG. 3 illustrates a partial cross-sectional view of the valve 200 in an unactuated state, in accordance with an example implementation. In the position shown in FIG. 3, the spool 224 is biased (e.g., by the solenoid spring) and the push pin 230 to be seated on or at the first seat 242 of the sleeve 210. Particularly, the spool 224 can have a first annular chamfered seating surface 300 on the exterior peripheral surface of the spool 224, and the first annular chamfered seating surface 300 mates with the first seat 242 formed by the sleeve 210. In this spool position, fluid received at the supply counterbore 212 is blocked by the spool 224, and particularly at the seating area between the spool 224 and the sleeve 210.

Also, in this position, the spool 224 is unseated with respect to the second seat 244. Specifically, an annular flow area or gap 302 is formed between a second annular chamfered seating surface 304 disposed on the exterior peripheral surface of the spool 224 the second seat 244 of the valve body 202.

Thus, fluid received at the operating port 206 flows through the cross-holes 218A, 218B, the operating counterbore 216, and the gap 302. The fluid flow then continues through flow areas formed between the exterior peripheral surface of the spool 224 and the interior peripheral surface of the valve body 202 toward the annular space 232, then through the cross-holes 234A, 234B to the vent port 208.

If cavitation bubbles formed in the fluid are allowed to implode near or within the gap 302, the implosion can cause wear of the second annular chamfered seating surface 304 and the second seat 244. Such wear can cause leakage flow from the operating port 206 to the vent port 208 through the seating area between the second annular chamfered seating surface 304 and the second seat 244 when the valve 200 is in the actuated state. Such leakage flow from the operating port 206 to the vent port 208 when the valve 200 is actuated can affect operation of a main valve controlled by the valve 200.

Configuration of the valve 200 may reduce the likelihood of formation of cavitation bubbles. Further, the configuration may force the bubbles to implode downstream from the gap 302 away from the second seat 244 and the second annular chamfered seating surface 304, as opposed to near or threat, to avoid wear of the second annular chamfered seating surface 304 or the second seat 244.

In particular, downstream from the gap 302, the spool 244 has an undercut 306 formed at a reduced diameter section of the spool 224 that has a first diameter "$d_1$" followed by an enlarged diameter land or enlarged diameter section 308 having a second diameter "$d_7$" larger than the first diameter at the undercut 306. The second diameter of the enlarged diameter section 308 is smaller than an inner diameter "$d_3$" of the valve body 202 (e.g., the diameter of the interior peripheral surface of the valve body 202) at the enlarged diameter section 308, such that an annular flow area 310 is formed between the interior peripheral surface of the valve body 202 and the enlarged diameter section 308 of the spool 224.

The annular flow area 310 is configured to operate as an orifice or flow restriction downstream of the gap 302. Particularly, fluid flowing from the operating port 206 through the gap 302, flows to the undercut 306, then through the annular flow area 310 prior to reaching the annular space 232 and flowing to the vent port 208. The annular flow area 310 restricts fluid flow therethrough and therefore generates back pressure (e.g., an increased pressure level) at the undercut 306 and the gap 302, and the annular chamber between the undercut 306 and the interior surface of the valve body 202 operate as a dampening chamber. In other words, the annular flow area 310 restricts fluid flow therethrough and therefore generates an increased bulk static pressure at the gap 302 that may reduce the likelihood of formation of cavitation bubbles at the gap 302.

Further, the flow restriction created by the annular flow area 310 can cause the flow velocity of fluid flowing through the annular flow area 310 to increase and the pressure level therein to decrease. As such, cavitation bubbles might form downstream of the annular flow area 310. Such bubbles might thus form downstream of, and away from, the gap 302, and might not affect the second seat 244 or the second annular chamfered seating surface 304.

In an example, as shown in FIGS. 2-3, the cross-holes 234A, 234B can be configured as counterbores having a small diameter hole, such as holes 312A, 312B, leading to a large diameter hole, such as holes 314A, 314B. In one example implementation, a magnitude of the annular flow area 310

$$\left(\text{e.g., } \frac{\pi}{4}(d_3^2 - d_2^2)\right)$$

can be substantially equal to a respective magnitude of a flow area through the holes 312A, 312B, in this example, the flow velocity might not change between flow velocity as the fluid enters the gap 302 and flow velocity as the fluid exits the gap 302, thereby avoiding sudden changes in flow velocity. Avoiding a change of flow velocity results in avoiding a change in pressure level of the fluid, and may thus cause the likelihood of bubble formation to be reduced. The term "substantially, equal" is used here to indicate that a magnitude of a first area (e.g., the annular flow area 310) is within a threshold percentage or value (e.g., 2-5%) of a magnitude of a second area (e.g., flow area through the holes 312A, 312B).

Further, downstream from the annular flow area 310, and particularly at the annular space 232, the inner diameter of the valve body 202 increases compared to the inner diameter of the valve body 202 at the annular flow area 310. Thus, the flow area increases as the fluid enters the annular space 232 after flowing through the annular flow area 310. The increase in the flow area can cause the flow velocity to decrease and the pressure level to increase. Such increase in pressure may cause cavitation bubbles that might have formed earlier in the annular flow area 310 to implode within the annular space 232 or within the cross-holes 234A, 234B away from the gap 302.

In one example implementation, diameters of the holes 312A, 312B can be made smaller than a diameter of the cross-hole 218A, 218B or a diameter of the small-diameter portion of the operating counterbore 216 (and counterbores similar to the operating counterbore 216 disposed in a radial array about the sleeve 210). In this example, the holes 312A, 312B restrict fluid flow and contribute to generating an increased bulk static pressure at the gap 302 to reduce the likelihood of formation of cavitation bubbles thereat.

As such, with the configuration of the valve 200, cavitation bubbles may implode downstream from the gap 302, and thus the implosion effects, i.e., wear, might not occur at the second annular chamfered seating surface 304 or the second seat 244. Therefore, damage to the second annular chamfered seating surface 304 and the second seat 244 may be reduced or eliminated. The second annular chamfered seating surface 304 and the second seat 244 may thus mate without leakage therebetween. Cavitation bubbles might form or implode downstream of the gap 302 at a location that does not affect operation of the valve 200. The tem) "without leakage" is used throughout herein to indicate that leakage flow does not exceed a permissible leakage flow that does not affect operation of the valve. With cavitation occurring, if at all, away from the second seat 244, cheaper materials and less costly machining can be used to manufacture the valve body 202 and the spool 224.

Figure 4:
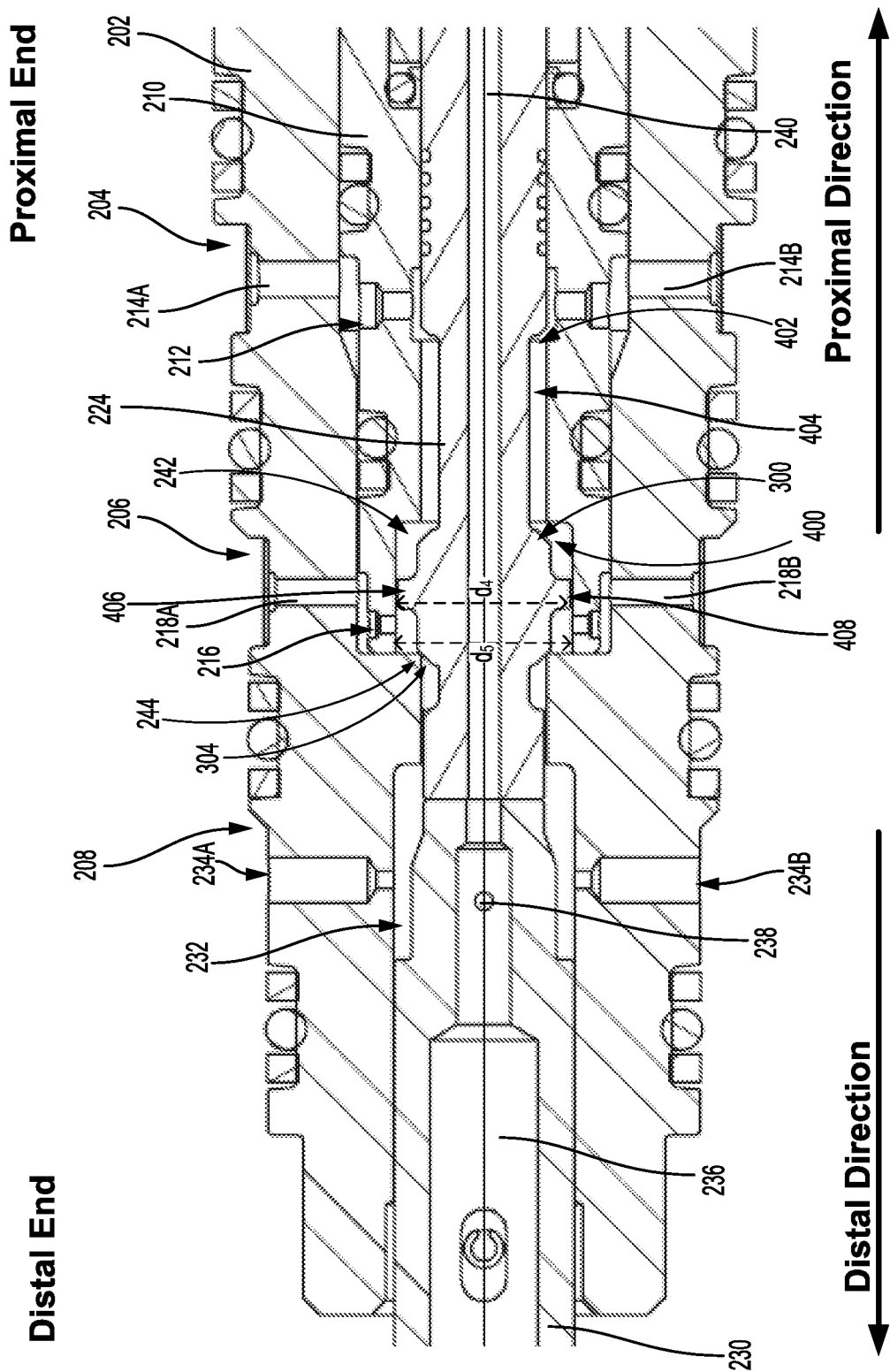
FIG. 4 illustrates partial cross-sectional view of the valve of FIG. 3 in an actuated state, in accordance with an example implementation.

The valve 200 is also configured to reduce the likelihood of forming and imploding cavitation bubbles at the first seat 242 when the valve 200 is actuated. FIG. 4 illustrates a partial cross-sectional view of the valve 200 in an actuated state, in accordance with an example implementation, in the position shown in FIG. 4, the spool 224 is pushed by the spring 226 in the distal direction to seat on the second seat 244 of the sleeve 210. Particularly, the second annular chamfered seating surface 304 mates with the corner of the second seat 244, thus blocking flow thereat.

Also, in this spool position, the spool 224 is unseated with respect to the first seat 242 of the sleeve 210. Specifically, a gap 400 is formed between the first annular chamfered seating surface 300 of the spool 224 and the first seat 242. Thus, fluid received at the supply counterbore 212 is allowed to flow through a flow area 402 formed between the spool 224 and the sleeve 210, through an annular space 404, then through the gap 400. Fluid continues through a flow area formed between the exterior peripheral surface of the spool 224 and the interior peripheral surface of the sleeve 210 toward the operating counterbore 216 and cross-holes 218A, 218B and then to the operating port 206.

If cavitation bubbles formed in the fluid are allowed to implode near or within the gap 400, the implosion can cause wear of the first annular chamfered seating surface 300 and the first seat 242. Such wear can cause leakage from the supply port 204 to the operating port 206 through the seating area between the first annular chamfered seating surface 300 and the first seat 242 when the valve 200 is unactuated. Such leakage flow can unintentionally, actuate a main valve controlled by the valve 200.

Configuration of the valve 200 may reduce the likelihood of formation of cavitation bubbles. Further, the configuration may force the bubbles to implode downstream from the gap 400 away from the first seat 242 and the first annular chamfered seating surface 300, as opposed to near or thereat, to avoid wear of the first annular chamfered seating surface 300 or the corner of the first seat 242.

In particular, downstream from the gap 400, the spool 244 has an enlarged diameter land or enlarged diameter section 406 having a diameter "$d_4$." The enlarged diameter section 406 is depicted as a protrusion or a flanged portion formed as a rim or rib projecting radially outward from the exterior peripheral surface of the spool 224. In other example implementation, rather than having an enlarged diameter section or protrusion from the spool 224, a collar or ring can be coupled to the exterior peripheral surface of the spool 224.

The diameter of the enlarged diameter section 406 is less than an inner diameter "$d_5$" of the sleeve 210 at the enlarged diameter section 406. Thus, an annular flow area 408 is thrilled between the interior peripheral surface of the sleeve 210 and the enlarged diameter section 406 of the spool 224.

The annular flow area 408 is configured to operate as an orifice or flow restriction downstream of the gap 400. Particularly, fluid flowing from the supply port 204 through the gap 400 flows through the annular flow area 408 prior to reaching the operating counterbore 216 and flowing to the operating port 206. The annular flow area 408 restricts fluid flow therethrough and therefore generates back pressure (e.g., an increased pressure level) at the gap 400. In other words, the annular flow area 408 restricts fluid flow therethrough and therefore generates an increased bulk static pressure at the gap 400 that may reduce the likelihood of formation of cavitation bubbles at the gap 400.

Further, the flow restriction created by the annular flow area 408 can cause the flow velocity of fluid flowing through the annular flow area 408 to increase and the pressure level therein to decrease. As such, cavitation bubbles might form downstream of the annular flow area 408. Such bubbles might thus form downstream of, and away from, the gap 400, and might not affect the first seat 242 and the first annular chamfered seating surface 300.

In one example implementation, a magnitude of the annular flow area 408 (e.g., $\pi/4(d_5^2-d_4^2)$) can be substantially equal to a respective magnitude of a flow area through the cross-holes 218A, 218B or a respective magnitude of a flow area through the small-diameter portions of the operating counterbore(s) 216. In this example, the flow velocity might not change between flow velocity as the fluid enters the gap 400 and flow velocity as the fluid exits the gap 400, thereby avoiding sudden changes in flow velocity. Avoiding a change of flow velocity results in avoiding a change in pressure level of the fluid, and may thus cause the likelihood of bubble formation to be reduced. The term "substantially equal" is used here to indicate that a magnitude of a first area (e.g., the annular flow area 408) is within a threshold percentage or value (e.g., 2-5%) of a magnitude of a second area (e.g., flow area through the cross-holes 218A, 218B or the small-diameter portions of the operating counterbore(s) 216).

Further, downstream from the annular flow area 408 (e.g., to the left of the enlarged diameter section 406 in FIG. 4), the diameter of the spool 224 is reduced, and thus the flow area increases after the fluid flows through the annular flow area 408. The increase in the flow area can cause the flow velocity to decrease and the pressure to increase. Such increase in pressure may cause cavitation bubbles that might have formed earlier in the annular flow area 408 to implode near or within the operating counterbore 216 away from the gap 400.

In an example, as shown in FIGS. 2-4, respective diameters of the cross-holes 218A, 218B can be made smaller than respective diameters of the cross-hole 214A, 214B (and/or respective diameters of the small-diameter portions of the operating counterbore(s) 216 can be made smaller than respective diameters of the small-diameter portions of supply counterbore(s) 212). In this example, the cross-holes 218A, 218B can cause a flow restriction that contributes to generating an increased bulk static pressure at the gap 400 to reduce the likelihood of formation of cavitation bubbles thereat.

As such, with the configuration of the valve 200, cavitation bubbles may implode downstream from the gap 400, and thus the implosion effects, i.e., wear, might not occur at the first annular chamfered seating surface 300 or the first seat 242. Therefore, damage to the first annular chamfered seating surface 300 and the first seat 242 may be reduced or eliminated. The first annular chamfered seating surface 300 and the first seat 242 may thus mate without leakage therebetween. Cavitation bubbles might form or implode downstream of the gap 400 at a location that does not affect operation of the valve 200. With cavitation occurring, if at all, away from the first seat 242, cheaper materials and less costly machining can be used to manufacture the sleeve 210 and the spool 224.

The valve 200 is thus configured to include flow restrictions downstream of seating regions to reduce the likelihood of formation and implosion of cavitation bubbles at or near the seats 242, 244 of the valve 200 and the corresponding annular chamfered seating surfaces 300, 304. Flow restrictions can be created by changing one or more of the outer diameter of the spool 224, the inner diameter of the sleeve 210, and the inner diameter of the valve body 202. In other example implementations, the flow restrictions can be created by additional components and seating arrangements.

Figure 5A:
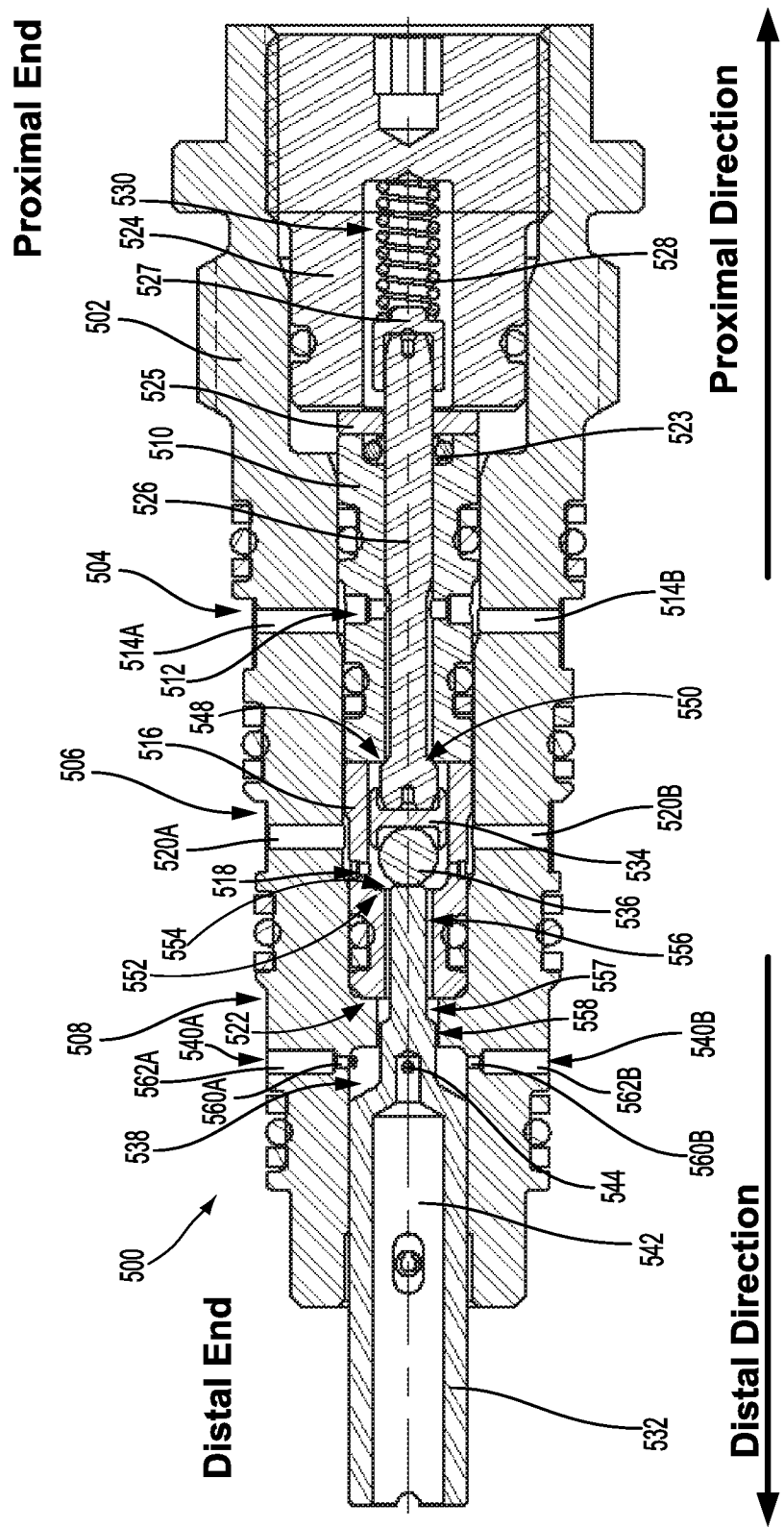
FIG. 5A illustrates a cross-sectional side view of another valve in an unactuated state, in accordance with an example implementation.
Figure 5B:
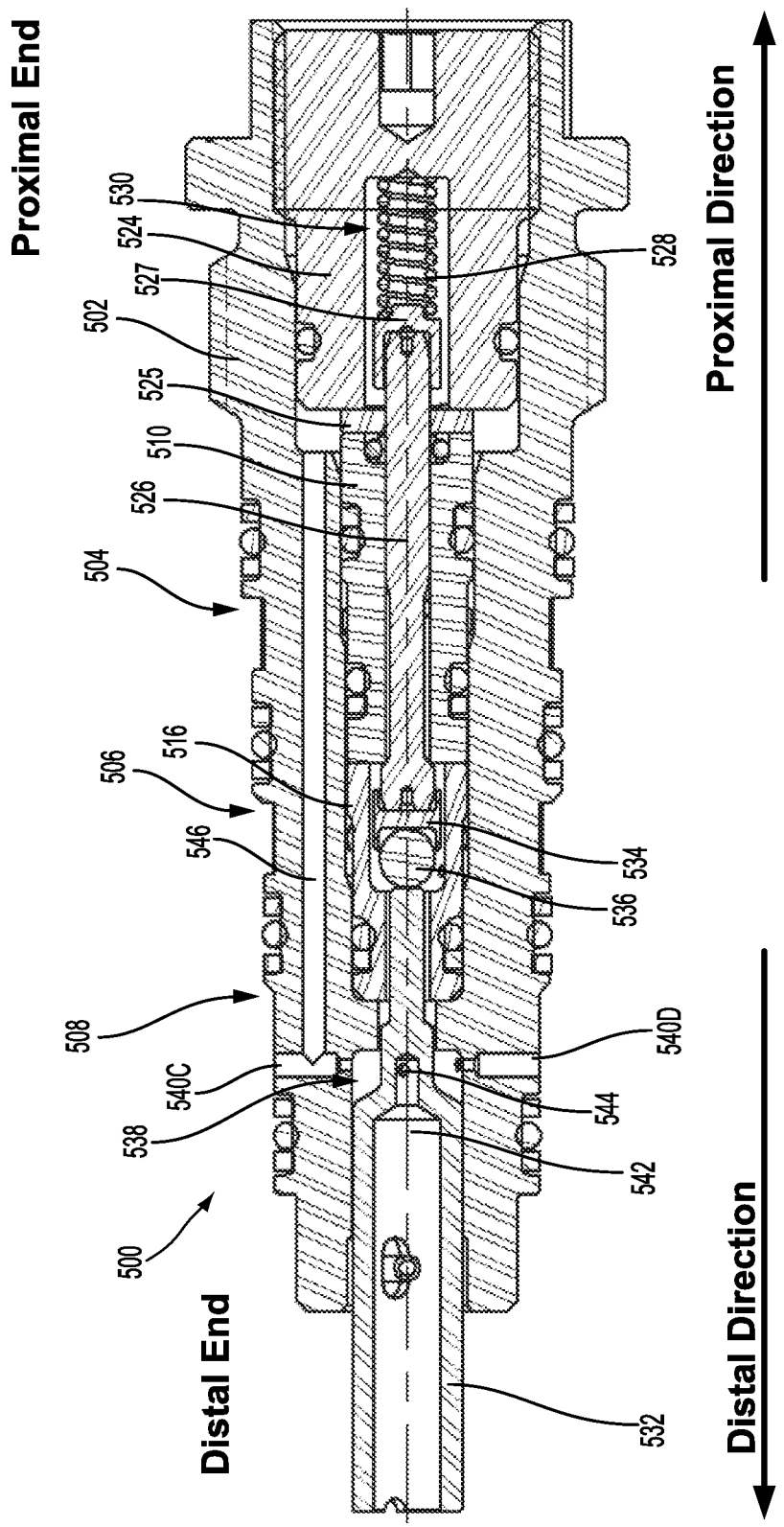
FIG. 5B illustrates a cross-sectional bottom view of the valve of FIG. 5A in the unactuated state, in accordance with an example implementation.

FIG. 5A illustrates a cross-sectional side view of a valve 500 in an unactuated state, and FIG. 5B illustrates a cross-sectional bottom view of the valve 500 in the unactuated state, in accordance with an example implementation. Similar to the valve 200, the valve 500 can be used, for example, in any of the pilot valves 134, 140, 146, and 154.

Referring to FIG. 5A, the valve 500 has a housing or valve body 502 that includes a supply port 504, a control or operating port 506, and a vent port 508. The ports 504, 506, and 508 are disposed longitudinally on an external peripheral surface of the valve body 502. In examples, the ports 504, 506, and 508 can be configured as annular grooves or cavities thrilled in an exterior peripheral surface of the valve body 502.

The supply port 504 can be fluidly coupled to a source of fluid (e.g., the pump 124 or the accumulators 128) configured to supply pressurized fluid (e.g., at 3000 psi via a pressure control valve) to the valve 500. The operating port 506 can be fluidly coupled to a control or inlet port of a main valve (e.g., the main valve 130) to provide pressurized fluid thereto and actuate the main valve. In other examples, the operating port 506 can be fluidly coupled to a port of any hydraulic consumer (e.g., hydraulic cylinder, motor, etc.).

The vent port 508 can be fluidly coupled to a tank or a reservoir (e.g., the tank 126) having fluid at a pressure lower than the pressure of fluid supplied by the source fluid. For instance, the pressure in the tank could be 70-140 psi. As shown in FIG. 5A, the operating port 206 is disposed longitudinally between the supply port 504 and the vent port 508.

The valve body 502 defines a longitudinal cylindrical cavity therein. The longitudinal cylindrical cavity of the valve body 502 is configured to receive a first sleeve 510 coaxial with the valve body 502. The first sleeve 510 has one or more supply openings, such as a supply counterbore 512 and corresponding supply counterbores disposed in a radial array about the first sleeve 510. The supply counterbore 512 is fluidly coupled to the supply port 504 through a plurality of cross-holes, such as cross-holes 514A, 514B, which can be disposed in a radial array about the valve body 502.

The valve 500 also includes a second sleeve 516 disposed in the longitudinal cylindrical cavity of the valve body 502 coaxial with the valve body 502 and the first sleeve 510. The second sleeve 516 is disposed longitudinally adjacent to the first sleeve 510 in the longitudinal cylindrical cavity within the valve body 502. The second sleeve 516 has one or more operating openings, such as operating counterbore 518 and corresponding operating counterbores disposed in a radial array about the second sleeve 516. The operating counterbore 518 is fluidly coupled to the operating port 506 through a plurality of cross-holes, such as cross-holes 520A, 520B, which can be disposed in a radial array about the valve body 502. In examples, the first sleeve 510 and the second sleeve 516 can be combined into a single sleeve.

A proximal end of the second sleeve 516 is secured against a distal end of the first sleeve 510, whereas a distal end of the second sleeve 516 is secured against a shoulder 522 that protrudes radially inward from an interior peripheral surface of the valve body 502, With this configuration, the second sleeve 516 is retained between the first sleeve 510 and the shoulder 522.

A proximal end of the first sleeve 510 is secured against a retainer 524 mounted in the longitudinal cylindrical cavity of the valve body 502 at a proximal end of the valve body 502. In an example, the valve 500 can include a ring, washer, or spacer 525 disposed between the first sleeve 510 and the retainer 524. The spacer 525 can be configured to retain an O-ring seal 523 between the spool 526 and the first sleeve 510.

The first sleeve 510 and the second sleeve 516 define a cavity therein that extends longitudinally within the first and second sleeves 510, 516. A spool 526 is disposed in the cavity defined within the first and second sleeves 510, 516, coaxial with the valve body 502 and the first and second sleeves 510, 516. The spool 526 is configured to move axially in the cavity defined within the first and second sleeves 510, 516.

The spool 526 interfaces with a spring cap 527 at a proximal end of the spool 526 so as to interact with a spring 528. The spring 528 is disposed in a blind longitudinal chamber or blind longitudinal cavity 530 defined within the retainer 524. The spring 528 applies a biasing force on the spool 526 in the distal direction (e.g., to the left in FIG. 5A).

The valve 500 further includes a push pin 532 disposed, at least partially, within the longitudinal cylindrical cavity of the valve body 502 at a distal end of the valve body 502. The valve 500 further includes a bushing 534 and a ball 536 disposed between the spool 526 and the push pin 532. In the cross-sectional views of Figures SA, 5B, the bushing 534 is I-shaped and has a first recess on its proximal side that receives a distal end of the spool 526 and has a second recess on its distal side that receives the ball 536. This way, the ball 536 interfaces with the bushing 534 and the bushing 534 interfaces with the spool 526. The ball 536 can be a metallic check ball, for example. In other example implementation, the ball 536 can be replaced by a poppet or similar movable member.

The push pin 532 narrows down at its proximal end such that an annular chamber or annular space 538 is formed between an exterior peripheral surface of the push pin 532 and an interior peripheral surface of the valve body 502. The annular space 538 is fluidly coupled to the vent port 508 via a plurality of cross-holes, such as cross-holes 540A, 540B shown in FIG. 5A and cross-holes 540C, 540D shown in FIG. 5B. The cross-holes 540A-540D can be disposed in a radial array about the valve body 502. Further, the annular space 538 is fluidly coupled to an internal longitudinal chamber 542, formed within the push pin 532, via at least one cross-hole 544 disposed in the push pin 532.

Referring to FIG. 5B, the valve body 502 includes a longitudinal channel 546 that extends longitudinally through the valve body 502. The longitudinal channel 546 fluidly couples the cross-hole 540C (which is fluidly coupled to the vent port 508) to a proximal end of the valve body 502 where the retainer 524 is disposed. With this configuration, the blind longitudinal cavity 530 can be fluidly coupled to a reservoir or tank through unsealed spaces between the retainer 524 and the spacer 525, the longitudinal channel 546, and the cross-hole 540C.

Further, the internal longitudinal chamber 542 of the push pin 532 can also be fluidly coupled to the reservoir or tank coupled to the vent port 508 via the cross-hole 544. Fluid having pressure level of the tank can thus be communicated to within the push pin 532 and can apply a force on the push pin 532, the ball 536, the bushing 534, and the spool 526 in the proximal direction. Also, the fluid having the pressure level of the tank can be communicated to the proximal end of the spool 526 and can apply a force on the spool 526 in the distal direction. As such, the spool 526 is configured to be pressure-balanced as fluid having the same pressure level (e.g., pressure level of fluid in a tank coupled to the vent port 508) is communicated to both ends of the spool 526.

Similar to the valve 200, the valve 500 can be inserted into a manifold having a cavity configured to receive the valve 500 therein. The manifold can have a supply port configured to fluidly couple the manifold and the supply port 504 of the valve 500 to a source of fluid (e.g., a pump, accumulator, pressure regulator circuit, etc.). The manifold can also include a vent or return port configured to fluidly couple the manifold and the vent port 508 of the valve 500 to a reservoir or tank. The manifold can further include a control or operating port configured to fluidly couple the manifold and the operating port 506 of the valve 500 to an inlet port of a main valve to actuate the main valve.

The valve 500 can be actuatable via manual, electric, pneumatic, or hydraulic actuator. For example, the valve 500 can be actuated electrically by way of a solenoid actuator coupled to the valve 500. Such a solenoid actuator can have a solenoid coil surrounding the push pin 532. When the solenoid coil is energized, a solenoid force is applied on the push pin 532, the solenoid force pulls the push pin 532 in the distal direction toward a pole piece of the solenoid actuator. Further, the solenoid actuator can include a solenoid spring that interface, directly or indirectly, with the push pin 532. The solenoid spring biases the push pin 532, the ball 536, the bushing 534, and the spool 526, to the proximal direction against a biasing force of the spring 528, which biases the spool 526 in the distal direction. Thus, the solenoid spring and the spring 528 operate to maintain contact between the spool 526, the bushing 534, the ball 536, and the pin 532 as they move axially within the valve body 502.

The solenoid spring can have a larger spring force or load compared to a respective spring load of the spring 528. As an example, the solenoid spring can have a spring load between 16 and 20 lbf, whereas the spring 528 can have a spring load of 8 lbf. However, if the solenoid coil is energized, the solenoid actuator is configured to generate a solenoid force that, along with the biasing force of the spring 528, are sufficient to move the push pin 532 in the distal direction (to the left in FIG. 5A) and overcome the force of the solenoid spring.

With this configuration, referring to FIG. 5A, when the solenoid coil is de-energized (i.e., when the valve 500 is in the unactuated state), the solenoid spring pushes the push pin 532 in the proximal direction (i.e., to the right in FIG. 5A), thus pushing the ball 536, the bushing 534, and the spool 526 against the spring 528. In the de-energized or unactuated state of the valve 500, the spool 526 rests against a first seat 548 disposed on, or thrilled by, an interior peripheral surface of the first sleeve 510 and blocks flow from the supply port 504 to the operating port 506.

Particularly, the spool 526 can have an annular chamfered seating surface 550 on an exterior peripheral surface of the spool 526, and the annular chamfered seating surface 550 mates with the first seat 548 of the first sleeve 510. In this spool position, fluid received at the supply counterbore 512 is blocked by the spool 526, and particularly at the seating area (i.e., at the first seat 548) between the spool 526 and the first sleeve 510.

Also, in this position, the ball 536, which is displaced axially in the proximal direction, is unseated with respect to a second seat 552 disposed on, or formed by, an interior peripheral surface of the second sleeve 516. Specifically, a flow area or gap 554 is formed between the ball 536 and the second seat 552.

Thus, fluid received at the operating port 506 flows through the cross-holes 520A, 520B, the operating counterbore 518, and the gap 554. The fluid flow then continues through an annular flow area 556 formed between the exterior peripheral surface of the push pin 532 and the interior peripheral surfaces of the second sleeve 516, then through an annular flow area 557 formed between the exterior peripheral surface of the push pin 532 and the interior peripheral surfaces of the valve body 502, and then through an annular flow area 558 formed between the exterior peripheral surface of the push pin 532 and the interior peripheral surfaces of the valve body 502. Fluid then flows through the cross-holes 540A, 540B (and 540C, 540D shown in FIG. 5B) to the vent port 508.

If cavitation bubbles formed in the fluid are allowed to implode near or within the gap 554, the implosion can cause wear of the second seat 552. Such wear can cause leakage flow between the ball 536 and the second seat 552 when the valve 500 is in the actuated state. Such leakage flow from the operating port 506 to the vent port 508 when the valve 500 is actuated can affect operation of a main valve controlled by the valve 500.

Configuration of the valve 500 may reduce the likelihood of formation of cavitation bubbles. Further, the configuration of the valve 500 may force the bubbles to implode downstream from the gap 554 away from the second seat 552, as opposed to near or thereat, to avoid wear of the second seat 552.

In particular, downstream from the gap 554, the annular flow area 556 operates as a flow restriction. Further, diameter of the push pin 532 increases to form an enlarged diameter section at the annular flow area 558, such that the annular flow area 558 is configured to operate as another flow restriction downstream of the gap 554.

Particularly, fluid flowing from the operating port 506 through the gap 554, flows between the ball 536 and the second sleeve 516 through the annular flow areas 556, 557, and 558, and then to the vent port 508. The annular flow areas 556, 558 can restrict fluid flow therethrough and therefore generate back pressure e.g., an increased pressure level) at the gap 554. In other words, the annular flow areas 556, 558 restrict fluid flow therethrough and therefore generate an increased bulk static pressure at the gap 554 that may reduce the likelihood of formation of cavitation bubbles at the gap 554.

Further, the flow restriction created by the annular flow area 556 can cause the flow velocity of fluid flowing through the annular flow area 556 to increase and the pressure level therein to decrease. As such, cavitation bubbles might form downstream of the annular flow area 556. Such bubbles might thus form downstream of, and away from, the gap 554, and might not affect the second seat 552. Further, the annular flow area 557 is larger than the annular flow area 556 because the diameter of the push pin 532 remains the same while the inner diameter of the valve body 502 is larger than the inner diameter of the second sleeve 516 downstream from the annular flow area 556. Thus, pressure level may increase within the annular flow area 557, causing bubbles to implode therein away from the second seat 552.

Similarly, the flow restriction created by the annular flow area 558 can cause the flow velocity of fluid flowing through the annular flow area 558 to increase and the pressure level therein to decrease. As such, cavitation bubbles might form within the annular flow area 558. Such bubbles might thus form downstream and away from, the gap 554, and might not affect the second seat 552. Further, the inner diameter of the valve body 502 downstream of the annular flow area 558 enlarges, while the diameter of the push pin 532 remains the same. Thus, pressure level may increase downstream of the annular flow area 558, causing bubbles to implode therein away from the second seat 552.

In an example, as depicted in FIGS. 5A-5B, the cross-holes 540A, 540B are configured as counterbores having a small diameter hole, such as holes 560A, 560B coupled to a large diameter hole, such as holes 562A, 562B. In one example implementation, a magnitude of the annular flow area 558 can be substantially equal to a respective magnitude of a flow area through the holes 560A, 560B. In this example, the flow velocity might not change between flow velocity as the fluid enters the gap 554 and flow velocity in the annular flow area 558. Avoiding a change of flow velocity results in avoiding a change in pressure level of the fluid, and may thus cause the likelihood of bubble formation to be reduced. The term "substantially equal" is used here to indicate that a magnitude of a first area (e.g., the annular flow area 558) is within a threshold percentage or value (e.g., 2-5%) of a magnitude of a second area (e.g., flow area through the holes 560A, 560B).

In one example implementation, diameters of the holes 560A, 560B can be made smaller than a diameter of the cross-hole 520A, 520B or a diameter of the small-diameter portion of the operating counterbore 518 (and counterbores similar to the operating counterbore 518 disposed in a radial array about the second sleeve 516). In this example, the holes 560A, 560B restrict flow and contribute to generating an increased bulk static pressure at the gap 554 to reduce the likelihood of formation of cavitation bubbles thereat.

As such, with this configuration of the valve 500, cavitation bubbles may implode downstream from the gap 554, and thus the implosion effects, i.e., wear, might not occur at the second seat 552. Therefore, damage to the second seat 552 may be reduced or eliminated. The ball 536 can thus be seated at the second seat 552 without leakage therebetween when the valve 500 is actuated. Cavitation bubbles might form or implode downstream of the gap 554 at a location that does not affect operation of the valve 500.

Figure 6A:
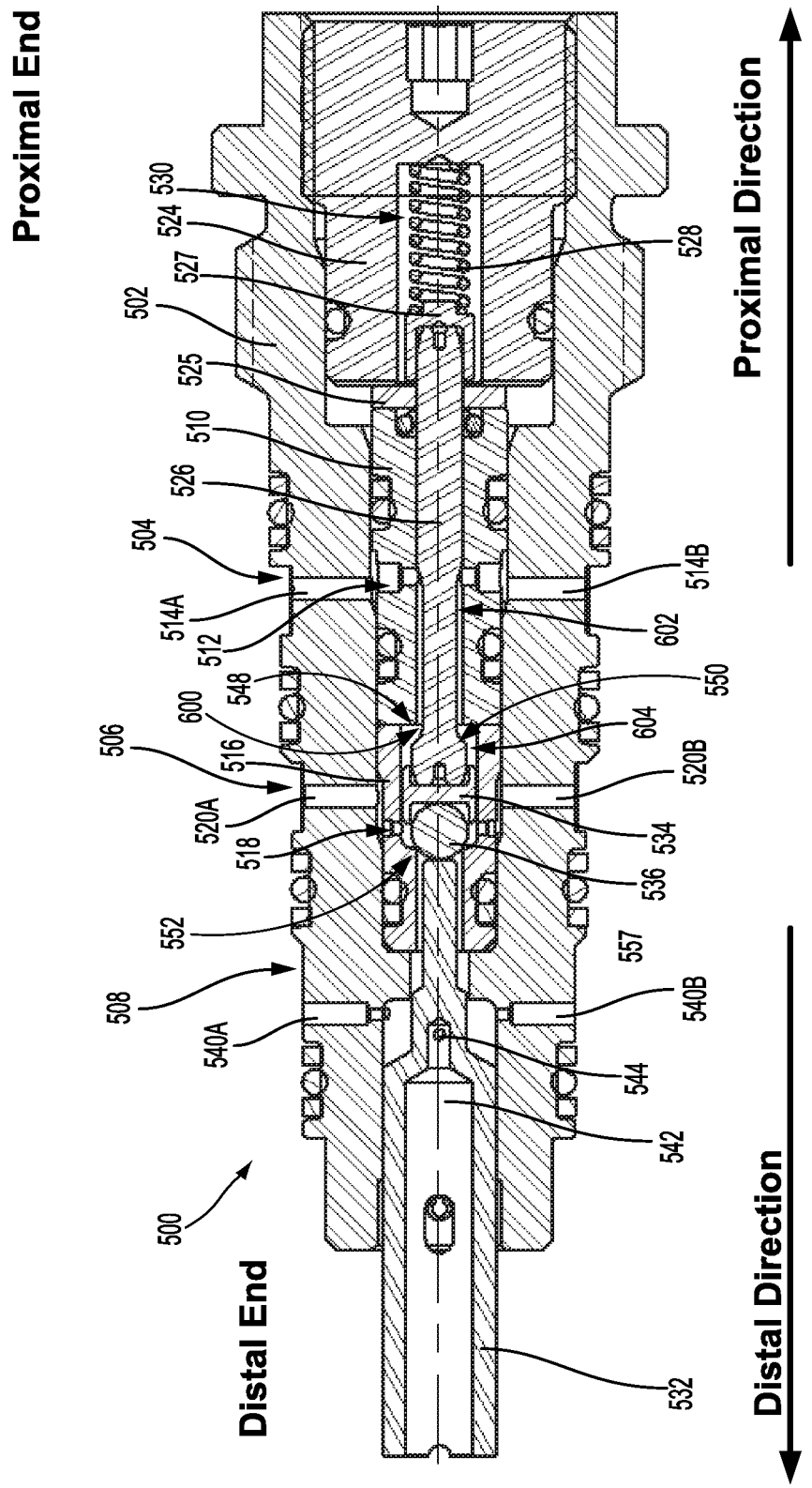
FIG. 6A illustrates a partial cross-sectional view of the valve of FIGS. 5A-5B in an actuated state, in accordance with an example implementation.

FIG. 6A illustrates a partial cross-sectional view of the valve 500 in an actuated state, in accordance with an example implementation. In the position shown in FIG. 6A, the spool 526 is pushed by the spring 528 in the distal direction. In turn, the spool 526 pushes the bushing 534 and the ball 536 in the distal direction, causing the ball 536 to seat on the second seat 552 of the second sleeve 516. Particularly, the ball 536 mates with the second seat 552, thus blocking flow thereat. As mentioned above, another type of movable member (e.g., a poppet) can be used in lieu of the ball 536, and such movable member can be configured to be seated at the second seat 552 when the valve 500 is actuated.

Beneficially, the second seat 552 is decoupled from the first seat 548 because they are formed on different components (i.e., the first sleeve 510 and the second sleeve 516). As such, manufacturing tolerances of concentricity between the first sleeve 510 and the second sleeve 516 can be loosened, thus reducing manufacturing cost of the valve 500. Further, the ball 536 is floating within the valve 500 and can move axially and peripherally, until it meets the second seat 552. This configuration can further reduce manufacturing tolerances of components of the valve 500, thus reducing cost.

In the actuated state of the valve 500, the spool 526 is unseated with respect to the first seat 548 of the first sleeve 510. Specifically, a gap 600 is formed between the annular chamfered seating surface 550 of the spool 526 and the first seat 548. Thus, fluid received at the supply counterbore 512 is allowed to flow through an annular flow area 602 formed between the spool 526 and the first sleeve 510, then through the gap 600. The flow continues through an annular flow area 604 formed between the exterior peripheral surface of the spool 526 and the interior peripheral surface of the second sleeve 516, then around a periphery, or an exterior peripheral surface, of the bushing 534 toward the operating counterbore 518 and the cross-holes 520A, 520B then to the operating port 506.

If cavitation bubbles formed in the fluid are allowed to implode near or within the gap 600, the implosion can cause wear of the annular chamfered seating surface 550 and the first seat 548. Such wear can cause leakage flow from the supply port 504 to the operating port 506 through the seating area between the annular chamfered seating surface 550 and the first seat 548 when the valve 500 is unactuated. Such leakage flow can unintentionally actuate a main valve controlled by the valve 500.

Configuration of the valve 500 may reduce the likelihood of formation of cavitation bubbles. Further, the configuration may force the bubbles to implode downstream from the gap 600 away from the first seat 548 and the annular chamfered seating surface 550, as opposed to near or thereat, to avoid wear of the annular chamfered seating surface 550 or the first seat 548.

Figure 6B:
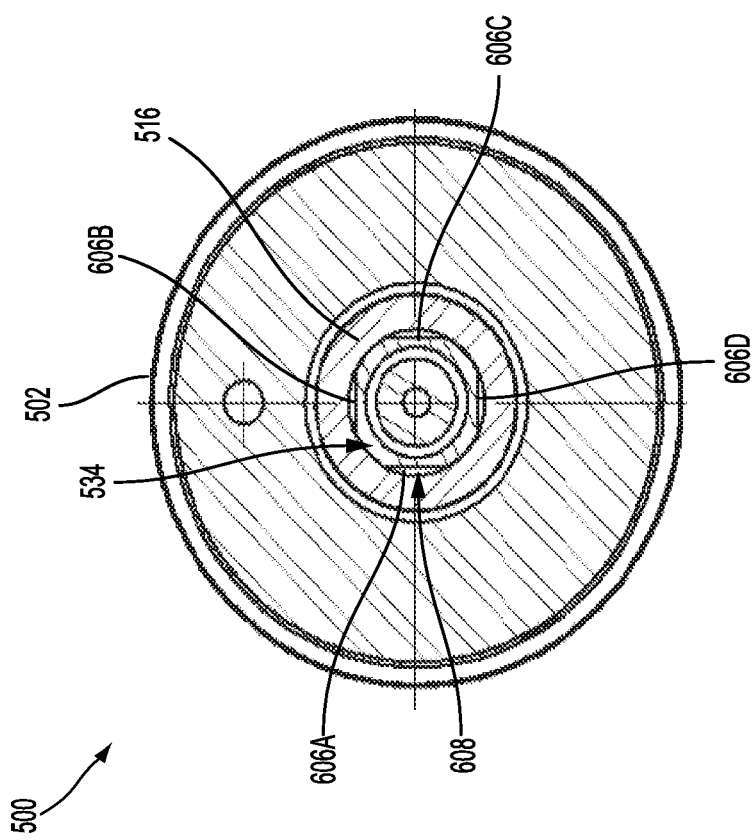
FIG. 6B illustrates a cross-sectional elevation view through bushing to illustrate a peripheral profile of the hushing, in accordance with an example implementation.

FIG. 6B illustrates a cross-sectional elevation view through the bushing 534 to illustrate a peripheral profile of the bushing 534, in accordance with an example implementation. As depicted in FIG. 6B, an exterior peripheral surface of the bushing 534 comprises one or more flat surface sections or portions, such as flat surface portions 606A, 606B, 606O, 606D, interleaved or interposed between circular surface portions or sections of the exterior peripheral surface of the bushing 534. While the circular surface portions of the exterior peripheral surface of the bushing 534 can slidably mate or interface with the interior peripheral surface of the second sleeve 516, gaps are formed between the flat surface portions 606A-606D and the interior peripheral surface of the second sleeve 516. For instance, a gap 608 is formed between the flat surface portion 606A and the interior peripheral surface of the second sleeve 516. Respective gaps, similar to the gap 608, are also formed as shown in FIG. 6B between the other flat surface portions 606B-606D and the interior peripheral surface of the second sleeve 516.

Referring to FIGS. 6A-6B together, the gaps between the flat surface portions 606A-606D and the interior peripheral surface of the second sleeve 516, e.g., the gap 608, are configured to operate as orifices or flow restrictions downstream of the gap 600. Particularly, fluid flowing from the supply port 504 through the gap 600 flows through the gap 608 prior to reaching the operating counterbore 518 and flowing through the cross-holes 520A, 520B to the operating port 506. The gap 608 restricts fluid flow therethrough and therefore generates back pressure (e.g., an increased pressure level) at the gap 600. In other words, the gap 608 restricts fluid flow therethrough and therefore generates an increased bulk static pressure at the gap 600 that may reduce the likelihood of formation of cavitation bubbles at the gap 600.

Further, the flow restriction created by the gap 608 can cause the flow velocity of fluid flowing through the gap 608 to increase and the pressure level therein to decrease. As such, cavitation bubbles might form downstream of the gap 608. Such bubbles might thus form downstream of, and away from, the gap 600, and might not affect the first seat 548 or the annular chamfered seating surface 550.

In one example implementation, magnitude of flow areas through the gaps between the flat surface portions 606A-606D and the interior peripheral surface of the second sleeve 516 (e.g., the gap 608 and corresponding gaps of the other flat surface portions 606B, 606C, and 606D) can be substantially equal to a respective magnitude of a flow area through the cross-holes 520A, 520B or a respective magnitude of a flow area through small-diameter portions of the operating counterbore(s) 518. In this example, the flow velocity might not change between flow velocity as the fluid enters the gap 600 and flow velocity as fluid exits in the gap 608. Avoiding a change of flow velocity results in avoiding a change in pressure level of the fluid, and may thus cause the likelihood of bubble formation to be reduced. The term "substantially equal" is used here to indicate that a magnitude of a first area (e.g., the gap 608 and the corresponding gaps of the other flat surface portions 606B, 606C, and 606D) is within a threshold percentage or value (e.g., 2-5%) of a magnitude of a second area (e.g., flow area through the cross-holes 520A, 520B or the small diameter portions of the operating counterbore(s) 518).

Further, downstream from the gap 608, in the space between the ball 536 and the interior surface of the second sleeve 516), the flow area increases. The increase in the flow area may cause the flow velocity to decrease and the pressure to increase. Such increase in pressure may cause cavitation bubbles that might have formed earlier in the gap 608 to implode near or within the operating counterbore 518 away from the gap 600.

In an example, as shown in FIG. 6A, a diameter of the operating counterbore 518 can be made smaller than a diameter of the supply counterbore 512. In this example, the operating counterbore 518 can cause a flow restriction can contribute to generating an increased bulk static pressure at the gap 600 to reduce the likelihood of formation of cavitation bubbles thereat.

As such, with this configuration of the valve 500, cavitation bubbles may implode downstream from the gap 600, and thus the implosion effects, i.e., wear, might not occur at the annular chamfered seating surface 550 or the corner of the first seat 548. Therefore, damage to the annular chamfered seating surface 550 and the first seat 548 may be reduced or eliminated. The annular chamfered seating surface 550 and the first seat 548 may thus mate without leakage therebetween. Cavitation bubbles might form or implode downstream of the gap 600 at a location that does not affect operation of the valve 500.

The valve 500 is thus configured to include flow restrictions downstream of seating regions to reduce likelihood of formation or implosion of cavitation bubbles at or near the seats 548, 552 of the valve 500.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
   a valve body having a first longitudinal cavity therein, wherein the valve body comprises: (i) a supply port configured to be fluidly coupled to a source of fluid, and (ii) an operating port configured to be fluidly coupled to another valve;
   a sleeve disposed in the first longitudinal cavity, wherein the sleeve comprises a second longitudinal cavity therein, and wherein the sleeve comprises (i) a first opening fluidly coupled to the supply port of the valve body, (ii) a second opening fluidly coupled to the operating port of the valve body, and (iii) a seat disposed on an interior peripheral surface of the sleeve;
   a spool mounted within the second longitudinal cavity and configured to move axially therein, wherein the spool is configured to be seated on the seat of the sleeve when the valve is unactuated, and wherein when the valve is actuated, the spool moves within the second longitudinal cavity such that a gap is formed at the seat between an exterior peripheral surface of the spool and the interior peripheral surface of the sleeve; and
   a flow restriction comprising as an annular flow area disposed downstream of the gap, wherein when the valve is actuated, fluid is allowed to flow from the supply port through the first opening and the gap and through the flow restriction prior to flowing through the second opening to the operating port, such that the flow restriction generates an increased pressure level at the gap, wherein a magnitude of the annular flow area of the flow restriction is substantially equal to a respective magnitude of flow area of the second opening of the sleeve.

2. The valve of claim 1, wherein the spool comprises an enlarged diameter section downstream of the gap, and wherein the annular flow area is formed between the exterior peripheral surface of the spool at the enlarged diameter section and the interior peripheral surface of the sleeve or an interior peripheral surface of the valve body.

3. The valve of claim 2, wherein the enlarged diameter section comprises a flanged portion formed as a rim projecting radially outward from the exterior peripheral surface of the spool.

4. The valve of claim 1, wherein the valve body further comprises a vent port configured to be fluidly coupled to a tank, wherein the seat is a first seat, and wherein the valve body comprises a second seat disposed on an interior peripheral surface of the valve body, and wherein when the valve is actuated, the spool moves axially off the first seat and is seated on the second seat so as to block fluid flow from the operating port to the vent port.

5. The valve of claim 4, wherein the gap is a first gap and the flow restriction is a first flow restriction, wherein:
   when the valve is unactuated, the spool is seated on the first seat to block fluid flow from the supply port to the operating port and a second gap is formed at the second seat between the exterior peripheral surface of the spool and the interior peripheral surface of the valve body,
   the spool comprises a first enlarged diameter section downstream of the first gap, wherein the first flow restriction comprises a flow area formed between the exterior peripheral surface of the spool at the first enlarged diameter section and the interior peripheral surface of the sleeve, wherein the spool further comprises a second enlarged diameter section, and
   the valve further comprises a second flow restriction disposed downstream of the second gap, wherein the second flow restriction comprises a respective flow area formed between the exterior peripheral surface of the spool at the second enlarged diameter section and the interior peripheral surface of the valve body, wherein when the valve is unactuated, fluid is allowed to flow from the operating port through the second gap and through the second flow restriction prior to flowing to the vent port, such that the second flow restriction generates a respective increased pressure level at the second gap.

6. A hydraulic system comprising:
   an actuator;
   a main valve configured to fluidly couple the actuator to a source of fluid and to a tank; and
   a pilot valve fluidly coupled to the source of fluid and the tank, the pilot valve being configured to actuate the main valve, wherein the pilot valve comprises:
      a valve body comprising (i) a supply port configured to be fluidly coupled to the source of fluid, and (ii) an operating port configured to be fluidly coupled to the main valve,
      a sleeve comprising (i) a first opening fluidly coupled to the supply port of the valve body, (ii) a second opening fluidly coupled to the operating port of the valve body, and (iii) a seat disposed on an interior peripheral surface of the sleeve,
      a spool axially movable within the sleeve, wherein the spool is configured to be seated on the seat of the sleeve when the pilot valve is unactuated, and wherein when the pilot valve is actuated, the spool moves such that a gap is formed at the seat between an exterior peripheral surface of the spool and the interior peripheral surface of the sleeve, and
      a flow restriction comprising an annular flow area disposed downstream of the gap, wherein when the pilot valve is actuated, fluid is allowed to flow from the supply port through the first opening and the gap and through the flow restriction prior to flowing through the second opening to the operating port, such that the flow restriction generates an increased pressure level at the gap, wherein a magnitude of the annular flow area of the flow restriction is substantially equal to a respective magnitude of flow area of the second opening of the sleeve.

7. The hydraulic system of claim 6, wherein the spool comprises an enlarged diameter section downstream of the gap, and wherein the annular flow area is formed between the exterior peripheral surface of the spool at the enlarged diameter section and the interior peripheral surface of the sleeve or an interior peripheral surface of the valve body.

8. The hydraulic system of claim 6, wherein the valve body further comprises a vent port configured to be fluidly coupled to the tank, wherein the seat is a first seat, and wherein the valve body comprises a second seat disposed on an interior peripheral surface of the valve body, and wherein when the pilot valve is actuated, the spool moves axially off the first seat and is seated on the second seat so as to block fluid flow from the operating port to the vent port.

9. A valve comprising:
   a valve body comprising: (i) a supply port configured to be fluidly coupled to a source of fluid, and (ii) an operating port configured to be fluidly coupled to another valve;
   a first sleeve comprising (i) a first opening fluidly coupled to the supply port of the valve body, (ii) a second opening fluidly coupled to the operating port of the valve body, and (iii) a seat disposed on an interior peripheral surface of the first sleeve;

a second sleeve disposed longitudinally adjacent to the first sleeve;

a spool axially movable within the first sleeve and the second sleeve, wherein the spool is configured to be seated on the seat of the first sleeve when the valve is unactuated, and wherein when the valve is actuated, the spool moves such that a gap is formed at the seat between an exterior peripheral surface of the spool and the interior peripheral surface of the first sleeve;

a bushing disposed within the second sleeve, wherein the bushing interfaces with the spool and is axially movable therewith; and a flow restriction disposed downstream of the gap, wherein the flow restriction comprises a flow area formed between an exterior peripheral surface of the bushing and an interior peripheral surface of the second sleeve, and wherein when the valve is actuated, fluid is allowed to flow from the supply port through the first opening and the gap and through the flow restriction prior to flowing through the second opening to the operating port, such that the flow restriction generates an increased pressure level at the gap, wherein the exterior peripheral surface of the bushing comprises one or more flat surface portions interposed between circular surface portions, and wherein the flow restriction comprises respective gaps formed between the one or more flat surface portions and the interior peripheral surface of the second sleeve.

10. The valve of claim 9, wherein the valve body further comprises a vent port configured to be fluidly coupled to a tank, wherein the seat is a first seat, and wherein the second sleeve comprises a second seat disposed on the interior peripheral surface of the second sleeve, and wherein the valve further comprises:

a movable member disposed in the second sleeve, wherein the movable member interfaces with the bushing and is axially movable therewith, wherein when the valve is actuated, the spool, the bushing, and the movable member move axially until the movable member is seated on the second seat so as to block fluid flow from the operating port to the vent port.

* * * * *